(12) United States Patent
Okamoto et al.

(10) Patent No.: US 8,130,274 B2
(45) Date of Patent: Mar. 6, 2012

(54) VIDEO QUALITY OBJECTIVE ASSESSMENT DEVICE, ASSESSMENT METHOD, AND PROGRAM

(75) Inventors: Jun Okamoto, Tokyo (JP); Takaaki Kurita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1357 days.

(21) Appl. No.: 11/663,679

(22) PCT Filed: Oct. 17, 2005

(86) PCT No.: PCT/JP2005/019019
§ 371 (c)(1),
(2), (4) Date: Mar. 22, 2007

(87) PCT Pub. No.: WO2006/043500
PCT Pub. Date: Apr. 27, 2006

(65) Prior Publication Data
US 2008/0143837 A1 Jun. 19, 2008

(30) Foreign Application Priority Data

Oct. 18, 2004 (JP) .................................. 2004-303204
Jul. 11, 2005 (JP) .................................. 2005-201916

(51) Int. Cl.
*H04N 17/00* (2006.01)
(52) U.S. Cl. ........................................ 348/180; 348/192
(58) Field of Classification Search .................. 348/180, 348/192, 181; 702/67, 69, 81, 122; 714/25, 714/48, 819; 382/181, 195, 199
See application file for complete search history.

(56) References Cited

U.S. PATENT DOCUMENTS

| 5,446,492 A | 8/1995 | Wolf et al. |
| 6,239,834 B1 | 5/2001 | Miyaji et al. |
| 6,704,451 B1 | 3/2004 | Hekstra et al. |
| 7,812,857 B2 * | 10/2010 | Bourret .......................... 348/180 |
| 2003/0011679 A1 * | 1/2003 | Jung et al. ..................... 348/181 |

(Continued)

FOREIGN PATENT DOCUMENTS

JP 01-298890 A 12/1989

(Continued)

OTHER PUBLICATIONS

A Study on Objective Video Quality Measurement Method Applicable to Arbitrary Videosequences, The Proceedings of the 2004 IEICE General Conference, Mar. 2004.

(Continued)

*Primary Examiner* — Victor Kostak
(74) *Attorney, Agent, or Firm* — Blakely, Sokoloff, Taylor & Zafman

(57) ABSTRACT

A video quality objective assessment device includes a temporal/spatial feature amount derivation unit (12) which derives a temporal/spatial feature amount (PC) which is the feature amount of deterioration which has occurred in a deteriorated video signal (PI), from the deteriorated video signal (PI) to be assessed and a reference video signal (RI) which is a signal before deterioration of the deteriorated video signal, and a subjective quality estimation unit (14) which weights the temporal/spatial feature amount (PC) according to the relationship between the deteriorated video obtained in advance and the user subjective assessment value, thereby estimating the subjective quality (Y) of the deteriorated video signal (PI). Thus, it is possible to estimate a video subjective quality even when deterioration occurs locally in the video in the temporal/spatial direction.

12 Claims, 10 Drawing Sheets

U.S. PATENT DOCUMENTS

| | | | |
|---|---|---|---|
| 2004/0012675 A1* | 1/2004 | Caviedes | 348/180 |
| 2004/0170395 A1* | 9/2004 | Filippini et al. | 386/111 |
| 2004/0252759 A1* | 12/2004 | Winder et al. | 375/240.12 |

FOREIGN PATENT DOCUMENTS

| | | |
|---|---|---|
| JP | 06-090468 A | 3/1994 |
| JP | 09-200805 A | 7/1997 |
| JP | 09-307930 A | 11/1997 |
| JP | 2004-080177 A | 3/2004 |
| JP | 2004-172753 A | 6/2004 |

OTHER PUBLICATIONS

Okamoto et al., "A Study on Application of Objective Video Quality Measurement", Proceedings of the 2002 Communications Society Conference of IEICE.

Okamoto et al., "A Study on Objective Video Quality Measurement Method Considering Characteristics of Reference Video", IEICE Technical Report, vol. 103, No. 289, CQ2003-52, Sep. 2003, pp. 61-66.

\* cited by examiner

124 FIRST DETERIORATION AMOUNT SUMMATION TABLE

| DETERIORATION INTENSITY Da | DETERIORATION INTENSITY Db | TOTAL DETERIORATION INTENSITY Dsum |
|---|---|---|
| 1 | 1 | 2 |
| 1 | 2 | 2.5 |
| 1 | 3 | 3.2 |
| 1 | 4 | 4.1 |
| 1 | 5 | 5.05 |
| 2 | 1 | 2.5 |
| 2 | 2 | 3.8 |
| 2 | 3 | 3.5 |
| 2 | 4 | 4.3 |
| 2 | 5 | 5.1 |
| . | . | . |
| . | . | . |
| . | . | . |
| M | N | S |

125 SECOND DETERIORATION AMOUNT SUMMATION TABLE

| STEADY-STATE AVERAGE DETERIORATION AMOUNT Dcons | LOCAL DETERIORATION Dpart | TEMPORAL/SPATIAL FEATURE AMOUNT PC |
|---|---|---|
| 1 | 1 | 1 |
| 1 | 2 | 2 |
| 1 | 3 | 3 |
| 1 | 4 | 4 |
| 1 | 5 | 5 |
| 2 | 1 | 0.8 |
| 2 | 2 | 1.8 |
| 2 | 3 | 2.8 |
| 2 | 4 | 3.9 |
| 2 | 5 | 4.9 |
| . | . | . |
| . | . | . |
| . | . | . |
| M | N | S |

VIDEO QUALITY OBJECTIVE ASSESSMENT DEVICE, ASSESSMENT METHOD, AND PROGRAM

This is a non-provisional application claiming the benefit of International application number PCT/JP2005/019019 filed Oct. 17, 2005.

TECHNICAL FIELD

The present invention relates to a video quality objective assessment device, assessment method, and program which estimate subjective quality perceived by a human observer from the measurement of the physical feature amount of a video signal or video file without performing any subjective assessment/quality test in which a human observer views a video and assesses its quality.

BACKGROUND ART

Conventional video providing services provide videos by using media such as radio waves which cause less errors at the time of transmission as in broadcasts and provide videos by using media such as tapes. For this reason, objective assessment techniques of deriving objective assessment values of video quality with accuracy equivalent to subjective assessment by comparing a reference video with a deteriorated video have been studied to derive proper assessment values mainly with respect to coding distortion.

As a conventional objective assessment technique, therefore, there has been proposed a technique of estimating subjective quality with accuracy equivalent to subjective assessment by deriving the average deterioration of an overall frame or an average deterioration in the time direction by using "a correction coefficient for each video", "SN", or "a deterioration amount based on a Sobel filter" on the basis of the fact that deterioration due to coding distortion is relatively uniform spatially and temporally (see, for example, Japanese Patent Laid-Open No. 2004-80177 and U.S. Pat. Nos. 5,446, 492 and 6,704,451).

In addition, according to the techniques disclosed in Jun Okamoto, Noriko Yoshimura, and Akira Takahashi, "A Study on Application of Objective Video Quality Measurement", PROCEEDINGS OF THE 2002 COMMUNICATIONS SOCIETY CONFERENCE OF IEICE and Jun Okamoto and Takaaki Kurita, "A Study on Objective Video Quality Measurement Method Considering Characteristics of Reference Video", IEICE Technical Report, Vol. 103, No. 289, CQ2003-52, September, 2003, pp. 61-66, a subjective assessment value can be estimated with target accuracy.

DISCLOSURE OF INVENTION

Problem to be Solved by the Invention

Recently, video providing services using communication networks have become popular. In such a communication network, packet losses and delay fluctuations often occur. Such network quality deterioration phenomena cause spatially (within one frame) local video deterioration and video deterioration which temporally varies in degree. Such video deterioration phenomena greatly affect video quality, and are deterioration phenomena which have not occurred in the past. This makes it impossible for the conventional assessment techniques to assess video quality with high accuracy.

The present invention has been made to solve the above problems, and has as its object to provide a video quality objective assessment device, assessment method, and program which can estimate the subjective quality of a video even if deterioration has locally occurred in the video in the temporal/spatial direction.

Means of Solution to the Problem

The present invention comprises a temporal/spatial feature amount derivation unit which derives a temporal/spatial feature amount as a feature amount of deterioration which has occurred in a deteriorated video signal as an assessment target from the deteriorated video signal and a reference video signal as a signal before deterioration of the deteriorated video signal, and a subjective quality estimation unit which estimates a subjective quality concerning the deteriorated video signal by weighting the temporal/spatial feature amount on the basis of a relationship between a deteriorated video obtained in advance and a subjective assessment value obtained by a user.

Effects of the Invention

The present invention includes a temporal/spatial feature amount derivation unit which derives a temporal/spatial feature amount as a feature amount of deterioration which has occurred in a deteriorated video signal as an assessment target from the deteriorated video signal and a reference video signal as a signal before deterioration of the deteriorated video signal, and a subjective quality estimation unit which estimates a subjective quality concerning the deteriorated video signal by weighting the temporal/spatial feature amount on the basis of a relationship between a deteriorated video obtained in advance and a subjective assessment value obtained by a user. This makes it possible to estimate the subjective quality of a video even if deterioration due to, for example, a packet loss on a communication network has locally occurred in the video in the temporal/spatial direction. Replacing the conventional subjective assessment technique with the video quality objective assessment device of the present invention will eliminate the necessity of much labor and time required for subjective assessment.

In addition, according to the present invention, the temporal/spatial feature amount derivation unit comprises first derivation means for deriving a spatial feature amount in consideration of spatial locality of deterioration which has occurred in an assessment target frame of the deteriorated video signal. This makes it possible to perform quality assessment in consideration of the spatial locality of deterioration and improve the accuracy of estimation of a subjective assessment value.

Furthermore, according to the present invention, the temporal/spatial feature amount derivation unit comprises second derivation means for deriving a temporal feature amount of deterioration which has occurred in an assessment target frame of the deteriorated video signal, and third deviation means for deriving the temporal/spatial feature amount in consideration of spatial locality of deterioration which has occurred in the assessment target frame and locality on a time axis by using the spatial feature amount and the temporal feature amount. This makes it possible to perform quality assessment in consideration of the locality of deterioration on the time axis and improve the accuracy of estimation of a subjective assessment value.

BEST MODE FOR CARRYING OUT THE INVENTION

First Embodiment

Video deterioration due to deterioration in the quality of a communication network such as packet losses and delay fluctuations is characterized by occurring locally in a space or occurring locally on the time axis.

Figure 1:
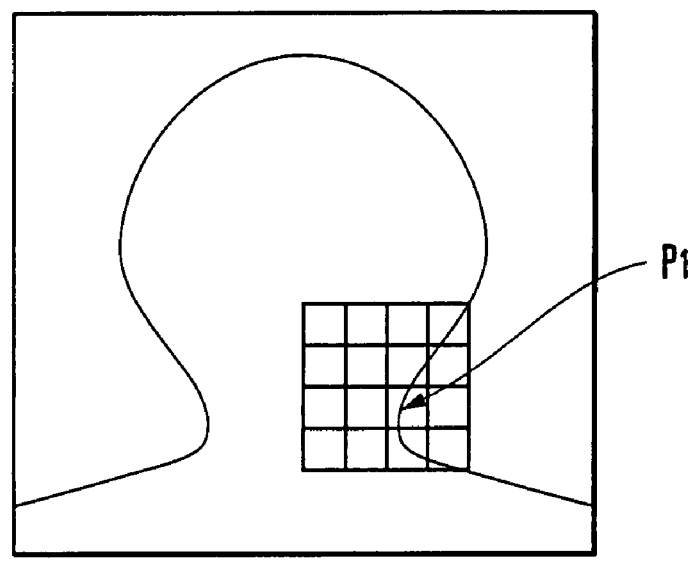
FIG. 1 is a view showing an example of a video in which deterioration has locally occurred in a space.

FIG. 1 is a view showing an example of a video with deterioration locally occurring in a space. Since video deterioration due to packet losses or coding errors in a communication network locally occurs centered on a moving region of a video, it is necessary to consider spatial locality. Reference symbol $P_1$ in FIG. 1 denotes a deterioration-occurring portion.

The present invention therefore estimates a subjective assessment value with respect to local video deterioration in a space by applying the weight obtained in advance from the relationship between an actual deteriorated video and a subjective assessment value to the deterioration amount based on the difference between a reference video and the deteriorated video on a frame basis and the deterioration amount based on the difference between the reference video and the deteriorated video on a local-deterioration-occurring region basis. This improves the accuracy of estimation of a subjective assessment value.

Figure 2:
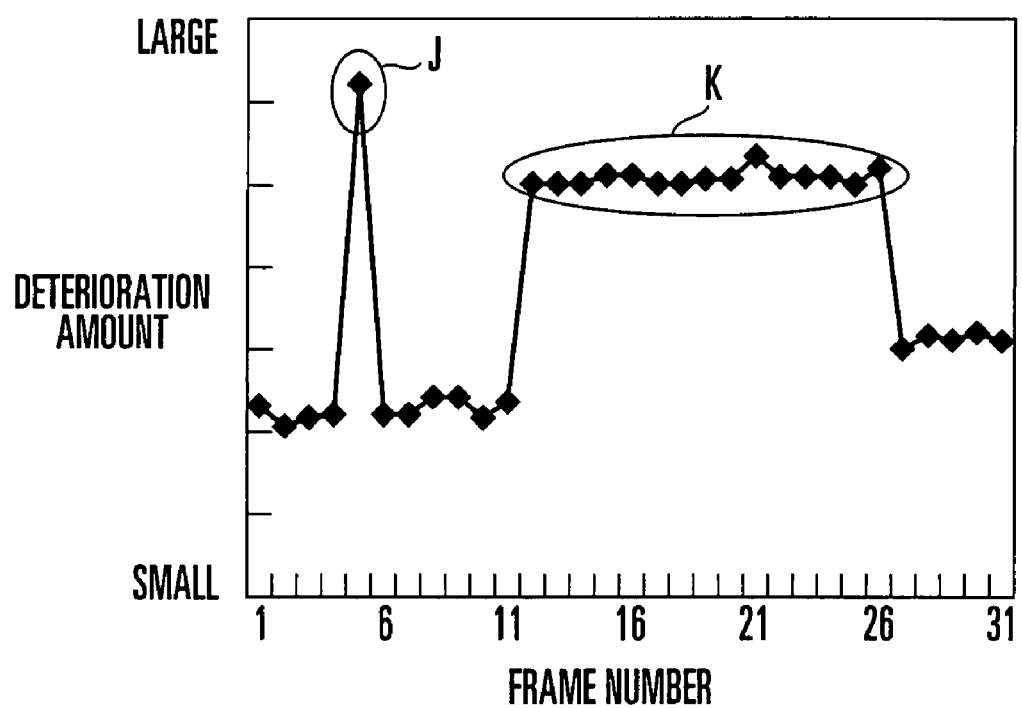
FIG. 2 is a graph showing an example of the relationship between the frame numbers of a video and the deterioration amounts of the video.

FIG. 2 is a view showing an example of video deterioration which has locally occurred on the time axis and an example of the relationship between the frame numbers of the video and the deterioration amounts of the video. A packet loss or a coding error occurring in a communication network will cause large local video deterioration such as deterioration (J in FIG. 2) as one-frame freeze which abruptly occurs due to frame omission or deterioration (K in FIG. 2) which continues until the next I (Intra) frame is decoded.

With regard to local video deterioration on the time axis, a subjective assessment value is estimated by weighting, in consideration of subjective assessment characteristic obtained in advance, increases (deterioration change amounts) and the durations of deterioration amounts when no local deterioration has occurred and local deterioration has occurred. This improves the accuracy of estimation of a subjective assessment value.

Figure 3:
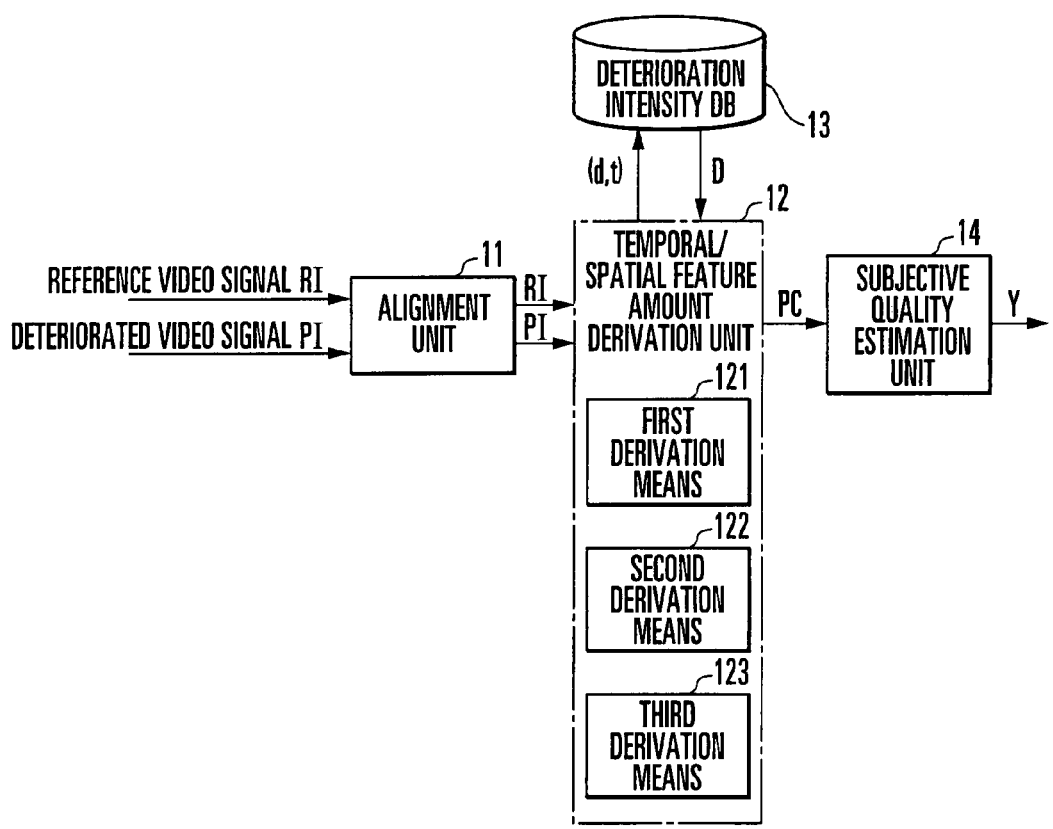
FIG. 3 is a block diagram showing the arrangement of a video quality objective assessment device according to the first embodiment of the present invention.

FIG. 3 is a block diagram showing the arrangement of a video quality objective assessment device according to the first embodiment of the present invention. An outline of the operation of this device will be described below. The video quality objective assessment device in FIG. 3 uses a deteriorated video signal PI as an assessment target output from an assessment target system (e.g., a codec) (not shown) and a reference video signal RI as a signal which is registered in a storage device (not shown) in advance before the deterioration of the deteriorated video signal PI.

An alignment unit 11 searches for a place where the reference video signal RI coincides in time and position with the deteriorated video signal PI while matching the frame display intervals and formats, and outputs the reference video signal RI and the deteriorated video signal PI in a state wherein they coincide in time and position to a temporal/spatial feature amount derivation unit 12.

The temporal/spatial feature amount derivation unit 12 derives a temporal/spatial feature amount PC, which is the physical feature amount of deterioration, by using the reference video signal RI and deteriorated video signal PI which are adjusted by the alignment unit 11 and referring to a deterioration intensity database (to be referred to as a deterioration intensity DB hereinafter) 13 as needed, and transfers the derived temporal/spatial feature amount PC to a subjective quality estimation unit 14. The temporal/spatial feature amount derivation unit 12 includes a first derivation means 121 which derives the spatial feature amount of deterioration which has occurred in an assessment target frame of the deteriorated video signal PI, a second derivation means 122 which derives the temporal feature amount of deterioration which has occurred in an assessment target frame of the deteriorated video signal PI, and a third derivation means 123 which derives the temporal/spatial feature amount PC by using the spatial feature amount and the temporal feature amount.

The subjective quality estimation unit 14 derives an objective assessment value by weighting the temporal/spatial feature amount PC received from the temporal/spatial feature amount derivation unit 12 by using an objective assessment value derivation function obtained in advance from the relationship between the subjective assessment value obtained by the user with respect to a deteriorated video and the temporal/spatial feature amount of the deteriorated video.

Figure 4:
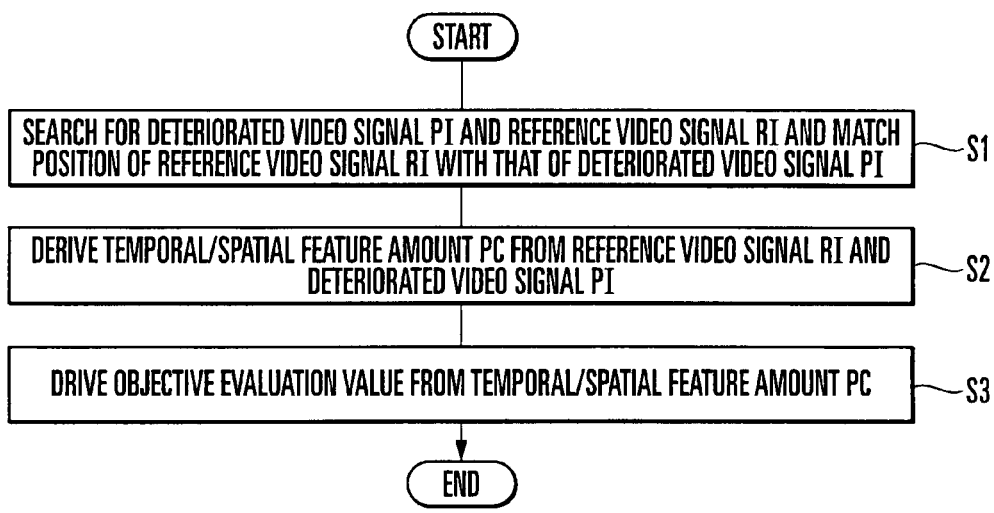
FIG. 4 is a flowchart showing the operation of the video quality objective assessment device according to the first embodiment of the present invention.

The operation of each unit in FIG. 3 will be described in detail below. FIG. 4 is a flowchart showing the operation of the video quality objective assessment device in FIG. 3.

The alignment unit 11 searches for the reference video signal RI of the same frame as that of the deteriorated video signal PI by retrieving the reference video signal RI on a frame basis in the time direction upon matching the frame display interval and format of the deteriorated video signal PI with those of the reference video signal RI, adjusts the deteriorated video signal PI and the reference video signal RI to make them become most similar on a pixel basis by moving the found reference video signal RI up, down, left, and right, and transfers the adjusted reference video signal RI and deteriorated video signal PI to the temporal/spatial feature amount derivation unit 12 (step S1 in FIG. 4).

The temporal/spatial feature amount derivation unit 12 derives a plurality of temporal/spatial feature amounts PC by performing the following processing for the reference video signal RI and deteriorated video signal PI received from the alignment unit 11, and transfers them to the subjective quality estimation unit 14 (step S2).

Figure 5:
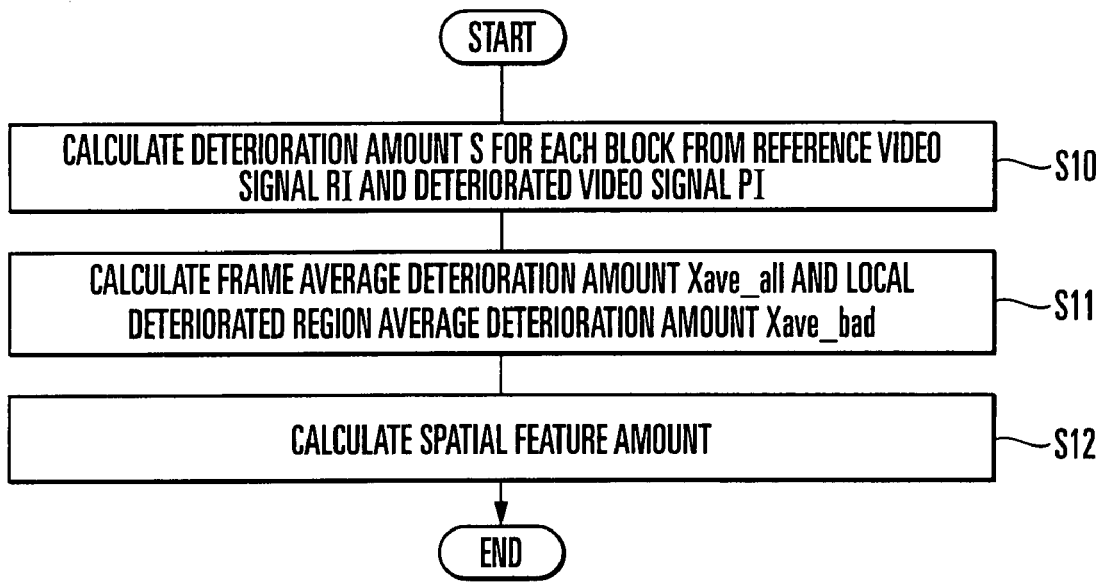
FIG. 5 is a flowchart showing a method of deriving a spatial feature amount with consideration being given to local video deterioration in a space according to the first embodiment of the present invention.

A method of deriving a spatial feature amount DS with consideration being given to local video deterioration in a space which occurs in an assessment target frame will be described in detail first. FIG. 5 is a flowchart showing a method of deriving the spatial feature amount DS.

The first derivation means 121 of the temporal/spatial feature amount derivation unit 12 calculates and stores a deterioration amount S for each block obtained by dividing the assessment target frame from the reference video signal RI and deteriorated video signal PI received from the alignment unit 11 (step S10 in FIG. 5). The deterioration amount S is, for example, a parameter such as a PSNR (Peak Signal to Noise Ratio), which is a signal-to-noise ratio, or Average Edge Energy defined by ANSI (American National Standards Institute).

Figure 6:
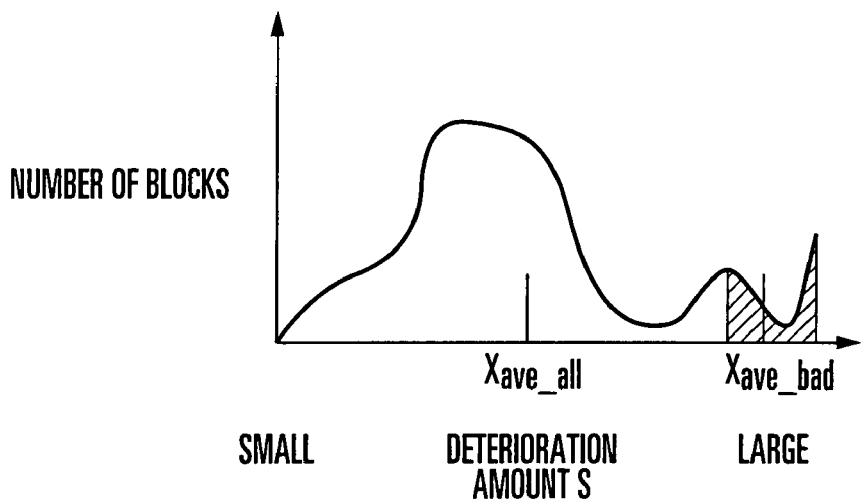
FIG. 6 is a graph showing a deterioration amount histogram for each block according to the first embodiment of the present invention.

The first derivation means 121 then calculates and stores a frame average deterioration amount Xave_all which is the value obtained by averaging the calculated deterioration amounts S for each block by the overall assessment target frame and a local deteriorated region average deterioration amount Xave_bad which is the value obtained by averaging the deterioration amounts S within a region of the assessment target frame in which the deterioration intensity is strong (step S11). FIG. 6 is a graph showing the histogram of the deterioration amount S for each block. The abscissa represents the deterioration amount S; and ordinate, the number of blocks obtained by accumulating blocks in each of which the deterioration amount S has occurred. Assume that in FIG. 6, video deterioration increases toward the right. The local deteriorated region average deterioration amount Xave_bad is the value obtained by averaging the deterioration amounts S included in a predetermined deterioration intensity range (the hatching portion in FIG. 6). In this case, assume that the number of blocks corresponding to higher 10% of the total number of blocks in which the deterioration amounts are large fall within the predetermined deterioration intensity range.

The first derivation means 121 then calculates and stores the spatial feature amount DS with consideration being given to local video deterioration in the space in the assessment target frame by calculating the following equation using coefficients A and B obtained in advance by a subjective assessment experiment (step S12).

$$DS = A \cdot Xave\_all + B \cdot Xave\_bad \quad (1)$$

where A is a coefficient obtained in advance by a subjective assessment characteristic when no local video deterioration has occurred in the space, and B is a coefficient obtained in advance by a subjective assessment characteristic when local video deterioration has occurred in the space.

It suffices to derive the coefficients A and B by determining a combination of optimal values so as to better match the spatial feature amount DS with subjective assessments based on a subjective assessment characteristic of the user with respect to a video in which only coding deterioration has occurred (a video in which no local video deterioration has occurred in the space) and a subjective assessment characteristic of the user with respect to a video in which local deterioration due to a packet loss or the like has occurred in addition to coding deterioration.

The temporal/spatial feature amount derivation unit 12 performs the above processing for each frame in accordance with the lapse of time. Note that this embodiment uses the frame average deterioration amount Xave_all and the local deteriorated region average deterioration amount Xave_bad to calculate the spatial feature amount DS. In addition to them, the temporal/spatial feature amount derivation unit 12 may use the statistics of various kinds of deterioration amounts of the assessment target frame. For example, in the deterioration amount distribution of the assessment target frame shown in FIG. 6, the temporal/spatial feature amount derivation unit 12 may use the area of a portion of each deterioration amount in which the occurrence frequency is high or the number of blocks therein to calculate the spatial feature amount DS, or may use the standard deviation or variance of a deterioration amount. In addition, the temporal/spatial feature amount derivation unit 12 may use the difference value between the frame average deterioration amount Xave_all and the local deteriorated region average deterioration amount Xave_bad. Alternatively, the temporal/spatial feature amount derivation unit 12 may calculate the spatial feature amount DS by combining these statistics.

Figure 7:
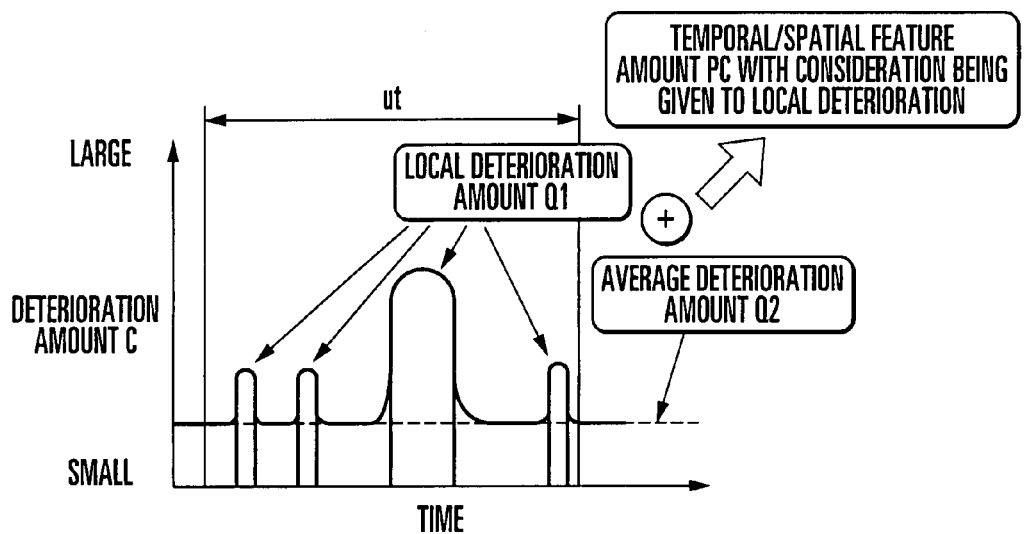
FIG. 7 is a graph for explaining how to capture local video deterioration on the time axis according to the first embodiment of the present invention.

A method of deriving the temporal/spatial feature amount PC with consideration being given to local video deterioration on the time axis will be described in detail next. When deriving the temporal/spatial feature amount PC, this method separately assesses the influence of video deterioration when no local video deterioration has occurred on the time axis and the influence of local video deterioration on the time axis and gives consideration to the influences of both the deteriorations. That is, as shown in FIG. 7, the method calculates the influence of an average deterioration amount Q2 in a unit measurement interval ut as well as the influence of only local deterioration in the unit measurement interval ut, and derives the temporal/spatial feature amount PC while giving consideration to the influences of both the deteriorations. Note that the unit measurement interval ut and a frame have a relation represented by unit measurement interval ut=one frame interval. Referring to FIG. 7, reference symbol Q1 denotes a local deterioration amount.

Figure 8:
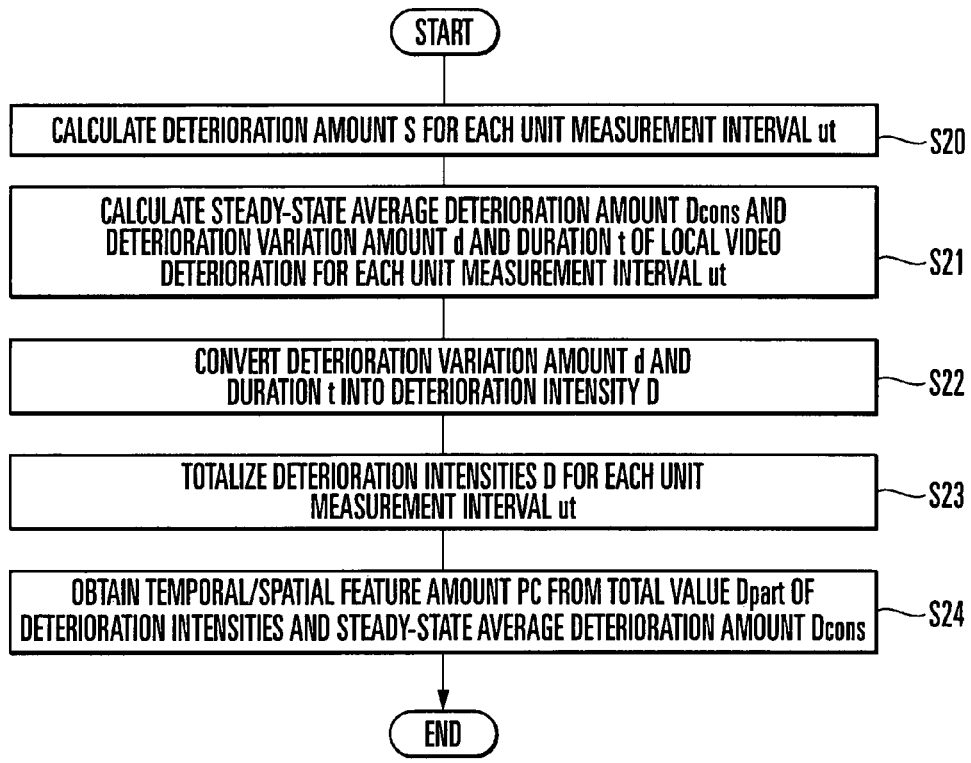
FIG. 8 is a flowchart showing a method of deriving a temporal/spatial feature amount with consideration being given to local video deterioration on the time axis according to the first embodiment of the present invention.

FIG. 8 is a flowchart showing a method of deriving the temporal/spatial feature amount PC. First of all, the temporal/spatial feature amount derivation unit 12 calculates and stores a deterioration amount C for each unit measurement interval ut (for each frame or at predetermined measurement intervals) from the reference video signal RI and deteriorated video signal PI received from the alignment unit 11 (step S20 in FIG. 8).

The second derivation means 122 derives a temporal feature amount. This temporal feature amount is, for example, a frame rate, a frame skip count, a TI value defined by ITU-T-1RecP.910, or a feature amount defined by ANSI. The temporal feature amount derived by the second derivation means 122 can be used as the deterioration amount C. In addition, the second derivation means 122 can also use, as the deterioration amount C, the spatial feature amount DS derived in advance by the first derivation means 121 or the deterioration amount S used to derive the spatial feature amount DS. The second derivation means 122 can also use, as the deterioration amount C, a value (objective assessment value) converted/estimated in advance as a subjective assessment value for each frame.

Figure 9:
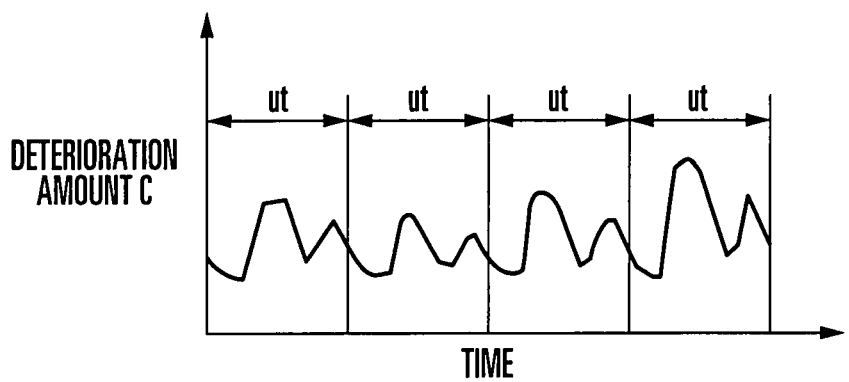
FIG. 9 is a graph showing an example of setting of a unit measurement interval in the derivation of a temporal/spatial feature amount according to the first embodiment of the present invention.
Figure 10:
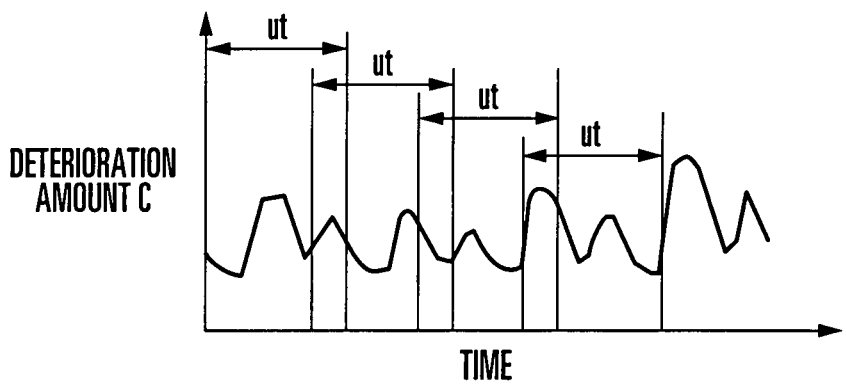
FIG. 10 is a graph showing another example of setting of a unit measurement interval in the derivation of a temporal/spatial feature amount according to the first embodiment of the present invention.

As a result of the processing in step S20, the deterioration amount C calculated in a time serial manner is derived. The third derivation means 123 of the temporal/spatial feature amount derivation unit 12 calculates and stores a steady-state average deterioration amount Dcons, a deterioration variation amount d of local video deterioration, and a duration t of the local video deterioration from the deterioration amount C for each unit measurement interval ut (step S21 in FIG. 8). Note that the unit measurement intervals ut may be set so as not to overlap as shown in FIG. 9 or may be set to overlap each other as shown in FIG. 10.

Figure 11:
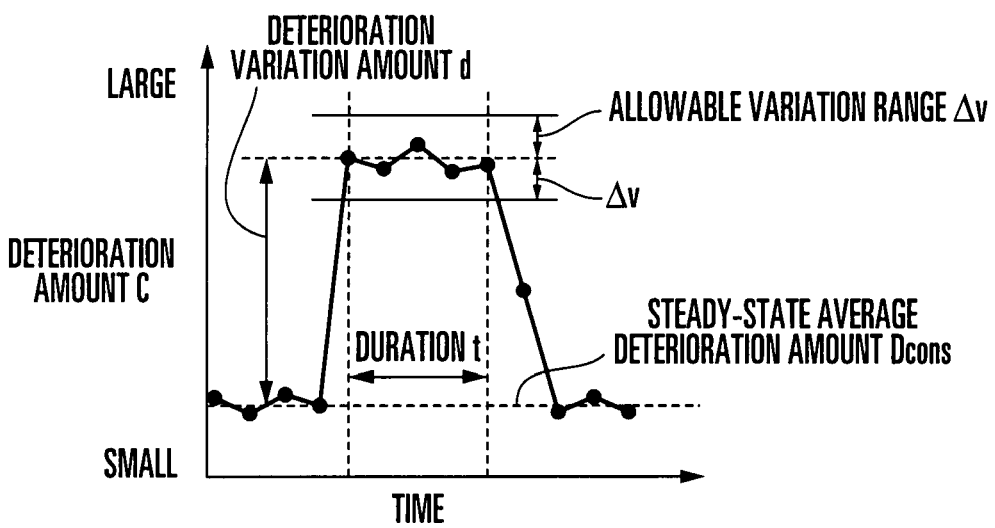
FIG. 11 is a graph showing a steady-state average deterioration amount, the deterioration variation amount of local video deterioration, and the duration.

FIG. 11 shows the steady-state average deterioration amount Dcons, the deterioration variation amount d of local video deterioration, and the duration t. The steady-state average deterioration amount Dcons is the average value of the deterioration amounts C in a steady-state period obtained by removing a local video deterioration occurrence period from the unit measurement interval ut, and is calculated for each unit measurement interval ut. Note that at some midpoint in the unit measurement interval ut, the steady-state average deterioration amount Dcons calculated in the immediately preceding unit measurement interval ut is used.

The deterioration variation amount d of local video deterioration is the difference value between the local video deterioration amount and the steady-state average deterioration amount Dcons. In this embodiment, when the difference value from the steady-state average deterioration amount Dcons in the unit measurement interval ut is equal to or more than a local deterioration discrimination threshold, it is determined that local video deterioration has occurred. Assume that the first deterioration amount C at which the difference value becomes equal to or more than the local deterioration discrimination threshold is set as a local video deterioration amount, and the difference between the local video deterioration amount and the steady-state average deterioration amount Dcons is the deterioration variation amount d.

Figure 12:
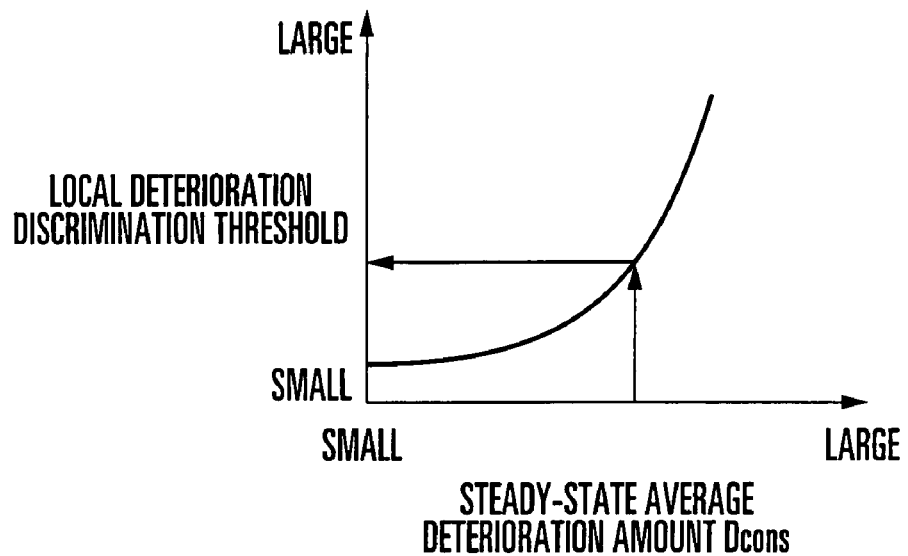
FIG. 12 is a graph showing a derivation function for a local deterioration discrimination threshold according to the first embodiment of the present invention.

The duration t of local video deterioration is the time during which when local video deterioration occurs, the difference value between the deterioration amount C and the steady-state average deterioration amount Dcons falls within the range of $(d-\Delta v)$ or more and $(d+\Delta v)$ or less, where $\Delta v$ is a predetermined allowable variation range. As a local deterioration discrimination threshold for determining whether local video deterioration has occurred, a value corresponding to the current steady-state average deterioration amount Dcons is determined from a local deterioration discrimination threshold derivation function like that shown in FIG. 12.

In order to prepare a local deterioration discrimination threshold derivation function in advance, it suffices to determine a local deterioration discrimination threshold derivation function so as to properly match the discrimination of local video deterioration subjectively performed by the user with the discrimination of local video deterioration based on the local deterioration discrimination threshold by checking the subjective assessment characteristic of the user with respect the video in which the local video deterioration has occurred while changing the steady-state average deterioration amount Dcons, and to make the third derivation means 123 store the function. Note that since local video deterioration sometimes occurs a plurality of number of times in the unit measurement interval ut, a combination of the deterioration variation amount d and the duration t is obtained and held every time local video deterioration occurs.

Figure 13:
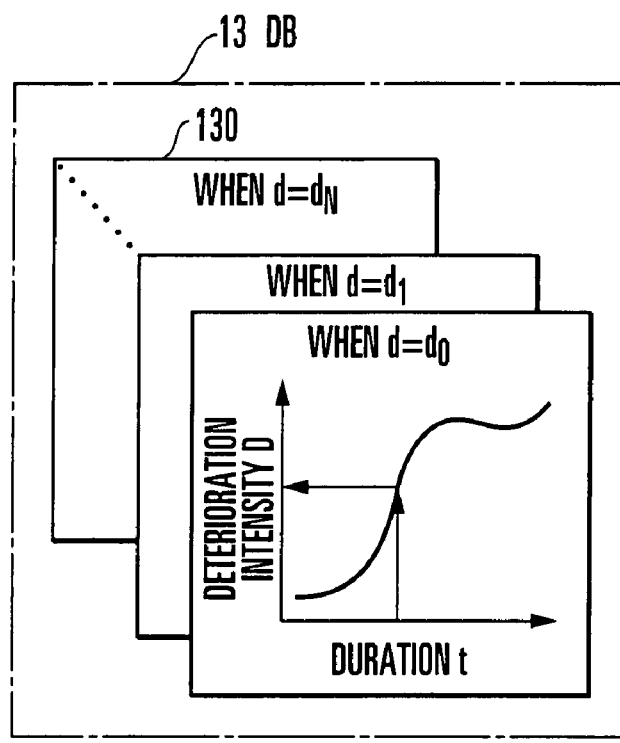
FIG. 13 is a view showing the arrangement of a table in a deterioration intensity database according to the first embodiment of the present invention.

The third derivation means 123 then refers to the deterioration intensity DB 13 on the basis of the deterioration variation amount d and the duration t calculated in step S21 to obtain and store a deterioration intensity D in consideration of the influences of the deterioration variation amount d and the duration t in the unit measurement interval ut on the subjective assessment by the user (step S22 in FIG. 8). As shown FIG. 13, the deterioration intensity DB 13 stores, in advance for each deterioration variation amount d, a duration-deterioration intensity table 130 in which a duration-deterioration intensity curve representing the relationship between the duration t and the deterioration intensity D is registered.

The third derivation means 123 converts a combination of the deterioration variation amount d and the duration t into the deterioration intensity D by referring to the deterioration intensity DB 13. It suffices to determine a duration-deterioration intensity curve so as to properly match the subjective assessment by the user with the deterioration intensity D by checking the subjective assessment characteristic of the user with respect to the video in which local video deterioration has occurred while changing the deterioration variation amount d and the duration t. The third derivation means 123 performs the processing in step S22 for each combination if a plurality of combinations of deterioration variation amounts d and durations t are obtained within the unit measurement interval ut.

The third derivation means 123 then totalizes the deterioration intensities D for each unit measurement interval ut and stores the total value (step S23 in FIG. 8). In order to totalize the deterioration intensities D, it suffices to simply add up the deterioration intensities D derived in deterioration amount S22. In this case, however, consideration is given to the following points to match with the subjective characteristics of the user. That is, if a video includes both strong local deterioration and weak local deterioration, the subjective assessment by the user is influenced by the local deterioration with high deterioration intensity. In addition, if a plurality of local deteriorations with similar intensities have occurred, the subjective assessment by the user is influenced by the total value of the deteriorations.

Figures 14, 15:
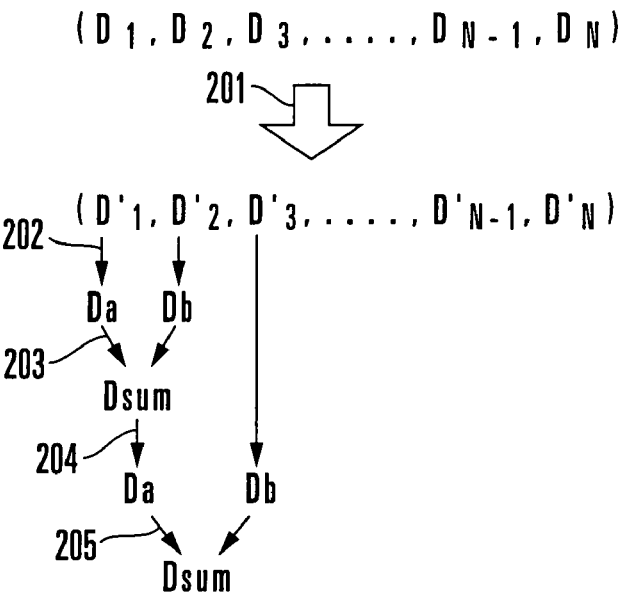
FIG. 14 is a view for explaining a method of totalizing deterioration intensities according to the first embodiment of the present invention.
FIG. 15 is a view showing the arrangement of a first deterioration amount summation table according to the first embodiment of the present invention.

In consideration of the above points, as shown in FIG. 14, deterioration intensities D1, D2, D3, . . . , DN−1, and DN of a plurality of local deteriorations which have occurred in the unit measurement interval ut are arranged in descending order, and the third derivation means 123 adds up the deterioration intensities in ascending order by referring to a first deterioration amount summation table 124 like that shown in FIG. 15. The first deterioration amount summation table 124 stores deterioration intensities Da and Db and total deterioration intensities Dsum in correspondence with each other, and is prepared in the third derivation means 123 in advance.

Letting D'1, D'2, D'3, ..., D'N−1, and D'N be deterioration intensities obtained by rearranging the deterioration intensities D1, D2, D3, ..., DN−1, and DN in descending order in step 201 in FIG. 14, first adding-up operation acquires a total deterioration intensity Dsum corresponding to the deterioration intensities Da and Db by referring to the first deterioration amount summation table 124 on the basis of the deterioration intensities Da and Db with the lowest deterioration intensity D'1 being Da and the next lowest deterioration intensity D'2 being Db, as indicated by step 202 (step 203).

The second or subsequent adding-up operation acquires the total deterioration intensity Dsum corresponding to the deterioration intensities Da and Db by referring to the first deterioration amount summation table 124 with the previously derived total deterioration intensity Dsum being Da and the lowest deterioration intensity of the deterioration intensities which have not been added up or processed being Db (step 205). The third derivation means 123 repeats the processing in steps 204 and 205 up to the deterioration intensity D'N. The third derivation means 123 stores the finally obtained total deterioration intensity Dsum as a total value Dpart of deterioration intensities in the unit measurement interval ut.

The first deterioration amount summation table 124 is determined to properly match the subjective assessment by the user with the total deterioration intensity Dsum by checking the subjective assessment characteristics of the user with respect to the video in which local video deterioration has occurred while changing the two deterioration intensities Da and Db. According to the first deterioration amount summation table 124, when the deterioration intensity Db is larger than the deterioration intensity Da, the total deterioration intensity Dsum is near the deterioration intensity Db. When the deterioration intensities Da and Db are almost equal to each other, the total deterioration intensity Dsum is near the sum of the deterioration intensities Da and Db. This makes it possible to match the total value of deterioration intensities D with the subjective characteristics of the user.

Figures 16, 17:
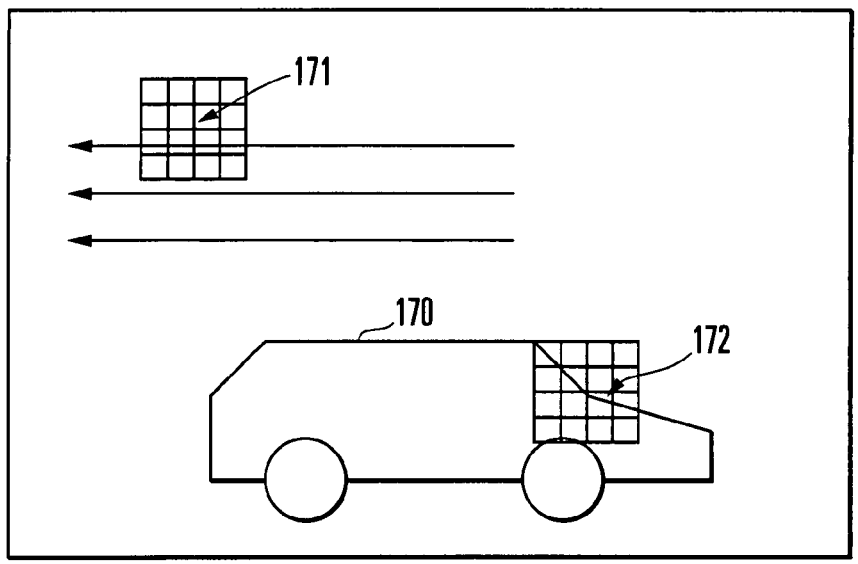
FIG. 16 is a view showing the arrangement of a second deterioration amount summation table according to the first embodiment of the present invention.
FIG. 17 is a view showing another example of a video in which deterioration has locally occurred in a space.

The third derivation means 123 acquires and stores the temporal/spatial feature amount PC with consideration being given to local video deterioration on the time axis by referring to a second deterioration amount summation table 125 like that shown in FIG. 16 on the basis of the total value Dpart of deterioration intensities in the unit measurement interval ut and the steady-state average deterioration amount Dcons (step S24 in FIG. 8).

The second deterioration amount summation table 125 stores the total values Dpart of deterioration intensities, the steady-state average deterioration amounts Dcons, and the temporal/spatial feature amounts PC in correspondence with each other, and is prepared in the third derivation means 123 in advance. The second deterioration amount summation table 125 is determined so as to properly match the subjective assessment by the user with the temporal/spatial feature amount PC by checking the subjective assessment characteristics of the user with respect to the video in which local video deterioration has occurred while changing the total value Dpart and the steady-state average deterioration amount Dcons.

With the above operation, the processing by the temporal/spatial feature amount derivation unit 12 is complete. Note that the deterioration amount C obtained in step S20 includes a plurality of types, e.g., a frame rate and a frame skip count. The temporal/spatial feature amount derivation unit 12 performs processing in step S21 to S24 for each type of deterioration amount C when obtaining a plurality of deterioration amounts C in step S20. Therefore, a plurality of temporal/spatial feature amounts PC are obtained for each unit measurement interval ut.

The subjective quality estimation unit 14 then calculates an objective assessment value by performing weighting operation represented by the following equation on the basis of a plurality of temporal/spatial feature amounts PC received from the temporal/spatial feature amount derivation unit 12 (step S3 in FIG. 4).

$$Y=F(X1, X2, \ldots, Xn) \tag{2}$$

where Y is an objective assessment value, X1, X2, ..., Xn are the temporal/spatial feature amounts PC, and F is an objective assessment value derivation function.

When the temporal/spatial feature amounts PC are the two amounts X1 and X2, the objective assessment value derivation function F is represented by, for example, the following equation:

$$Y=F(X1, X2)=\alpha X1+\beta X2+\gamma \tag{3}$$

where X1 is the temporal/spatial feature amount PC obtained from the spatial feature amount DS by the processing in steps S21 to S24 when, for example, the spatial feature amount DS is used as the deterioration amount C, and X2 is the temporal/spatial feature amount PC obtained from a frame rate when, for example, the frame rate is used as the deterioration amount C.

In the above equation, a, β, and γ are predetermined coefficients. In order to derive the coefficients a, β, and γ, it suffices to determine a combination of optimal values so as to properly match the subjective assessment by the user with the objective assessment value Y by checking the subjective assessment characteristics of the user with respect to the video in which local video deterioration has occurred while changing the deterioration amount.

Second Embodiment

The second embodiment of the present invention will be described next. FIG. 17 is a view showing another example of a video in which local video deterioration has occurred in a space. FIG. 17 shows a video in which the background moves at high speed from the right to the left because a camera is tracking the movement of a vehicle 170 as an object. Consider local video deterioration in a space. In this case, even if local video deterioration 171 occurs in a portion which moves fast and cannot be followed by the eye, this video deterioration has little influence on the subjective assessment by the user. That is, the subjective assessment by the user varies depending on the moving speed of the video. In addition, local video deterioration 172 which has occurred in an object region influences the subjective assessment by the user more than the local video deterioration 171 which has occurred in the background region. That is, the subjective assessment by the user varies depending on the attention level (attention degree) of the user with respect to the video.

This embodiment therefore improves the accuracy of estimation of a subjective assessment value by performing weighting in consideration of variations in subjective assessment depending on the moving speed of a video, that is, deterioration is easy to detect or not easy to detect depending on the moving speed of the video. The embodiment also improves the accuracy of estimation of a subjective assessment value by performing weighting in consideration of variations depending on the attention level of the user with respect to the video, that is, whether a region in which local video deterioration occurs is a region to which attention is to be paid, like an object.

Figure 18:
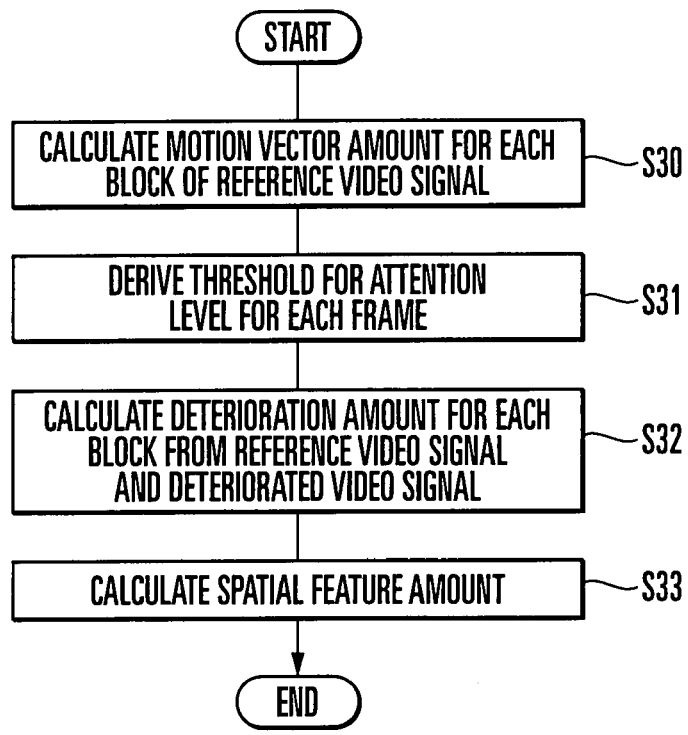
FIG. 18 is a flowchart showing a method of deriving a spatial feature amount with consideration being given to local video deterioration in a space according to the second embodiment of the present invention.

The arrangement of a video quality objective assessment device of this embodiment and a processing procedure are the same as those in the first embodiment. Therefore, this embodiment will be described by using the reference numerals in FIGS. 3 and 4. The embodiment differs from the first embodiment in the method of deriving a spatial feature amount DS by using a first derivation means 121 of a temporal/spatial feature amount derivation unit 12 in the processing in step S2 in FIG. 4. The method of deriving the spatial feature amount DS in consideration of local video deterioration in a space which occurs in an assessment target frame will be described below. FIG. 18 is a flowchart showing the method of deriving the spatial feature amount DS according to this embodiment.

Figure 19:
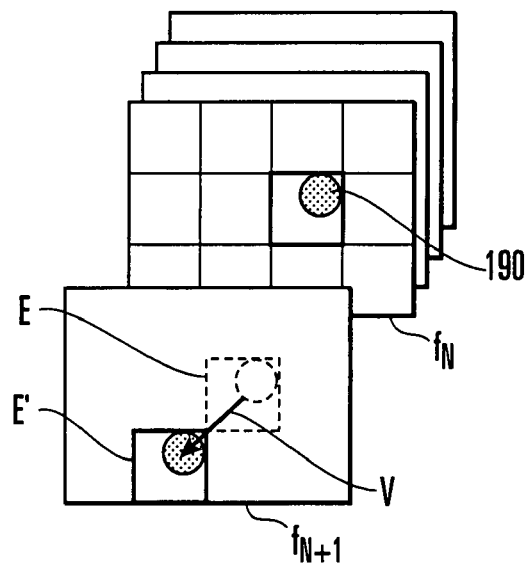
FIG. 19 is a view for explaining a motion vector.

The first derivation means 121 of the temporal/spatial feature amount derivation unit 12 calculates and stores a motion vector for each block obtained by dividing an assessment target frame from a reference video signal RI received from an alignment unit 11 (step S30 in FIG. 18). FIG. 19 is a view for explaining a motion vector. A motion vector is a vector indicating the moving amount (direction and distance) of, for example, a block of 8×8 pixels between frames. It suffices to obtain the moving amount of a block by finding out a block exhibiting the minimum difference value between the current frame and the immediately preceding frame. For example, FIG. 19 shows a scene in which a ball 190 moves to the lower left. In this case, a block E of an immediately preceding frame fN has moved to E' in a current frame fN+1. The motion vector in this case is represented by V in FIG. 19. The first derivation means 121 calculates a motion vector amount for each block with respect to one frame of the reference video signal RI, and calculates the direction and length (norm) for each block.

The first derivation means 121 then derives an attention level threshold for each assessment target frame which is required to derive an attention level for each block in accordance with the motion vector distribution characteristic of the reference video signal RI which is calculated in step S30 (step S31). If there is a region comprising a plurality of blocks having the same motion vector, and a predetermined number or more of blocks belong to the region, the first derivation means 121 derives a threshold for classifying regions into two kinds of regions, i.e., a background region (attention level 2) in which a plurality of blocks having the same motion vector exist and to which a predetermined number or more of blocks belong, and an object region (attention level 1) in which blocks having other motion vectors exist. Note that the embodiment may use two or more attention levels.

When the attention level of the user with respect to a video is to be determined, the following two cases are conceivable as cases wherein a background moves, in consideration of camera work to be done in accordance with the movement of an object.

In the first case, the camera moves up, down, left, and right (pans and tilts) in accordance with the movement of the object. When the camera moves up, down, left, and right in accordance with the movement of the object, the background region moves in the opposite direction to the moving direction of the camera. When, therefore, there is a region comprising a plurality of blocks whose motion vectors are equal in direction and length and a predetermined number or more of blocks belong to the region, the first derivation means 121 sets the region as a background region. Note that according to this attention level determination method, even if the object does not move, such a region is determined as a background region.

In the second case, the camera performs zooming operation (enlarging or reducing operation) with respect to an object. When an object is to be enlarged, motion vectors occur radially in all directions from a position of the object (e.g., the central portion of a video) to peripheral portions. In contrast, when the object is to be reduced, motion vectors occur from peripheral portions to a position of the object. In addition, when the object is to be enlarged or reduced, motion vectors in a background region of a peripheral portion are longer than the motion vectors of the object located near the central portion of the video.

When, therefore, there is a region in which motion vectors are uniformly distributed in the respective directions and which comprises a plurality of blocks whose motion vectors have lengths equal to or more than a threshold, the first derivation means 121 sets this region as a background region. Although the first derivation means 121 may use a predetermined constant value as this threshold, the first derivation means 121 may obtain a threshold from a motion vector distribution in the following manner. When obtaining a threshold from a motion vector distribution, the first derivation means 121 obtains a motion vector histogram with the abscissa representing the lengths of motion vectors and the ordinate representing the occurrence frequency (block count) of motion vectors. The first derivation means 121 then determines an arbitrary boundary value on the abscissa of the histogram, and obtains the occurrence frequency of motion vectors longer than the boundary value. When the occurrence frequency reaches, for example, 80% or more of the total number of blocks, the first derivation means 121 sets this boundary value as a threshold.

The first derivation means 121 then calculates a deterioration amount S for each block obtained by dividing an assessment target frame from the reference video signal RI and the deteriorated video signal PI, and stores the value at each position in the frame (step S32). The deterioration amount S is, for example, a parameter such as a PSNR, which is a signal-to-noise ratio, or Average Edge Energy defined by ANSI.

Finally, the first derivation means 121 calculates and stores the spatial feature amount DS with consideration being given to local video deterioration in a space in the assessment target frame as indicated by the following equation by using the results obtained in steps S30 to S32 (step S33).

$$DS = (1/N) \times \Sigma(F1 \times F2 \times Si) \quad (4)$$

where N is the number of target blocks, $F1i$ is a weighting factor dependent on the direction and length of the motion vector of a block i (i is a natural number from 1 to N), $F2i$ is a weighting factor dependent on the attention level of the block i, and $Si$ is the deterioration amount of the block i. Equation (4) indicates that the deterioration amount S is weighted by weighting factors F1 and F2 for each block, and the value obtained by averaging the results obtained for the respective blocks by the overall assessment target frame is set as the spatial feature amount DS.

The following is a specific method of deriving the weighting factors F1 and F2.

Figure 20:
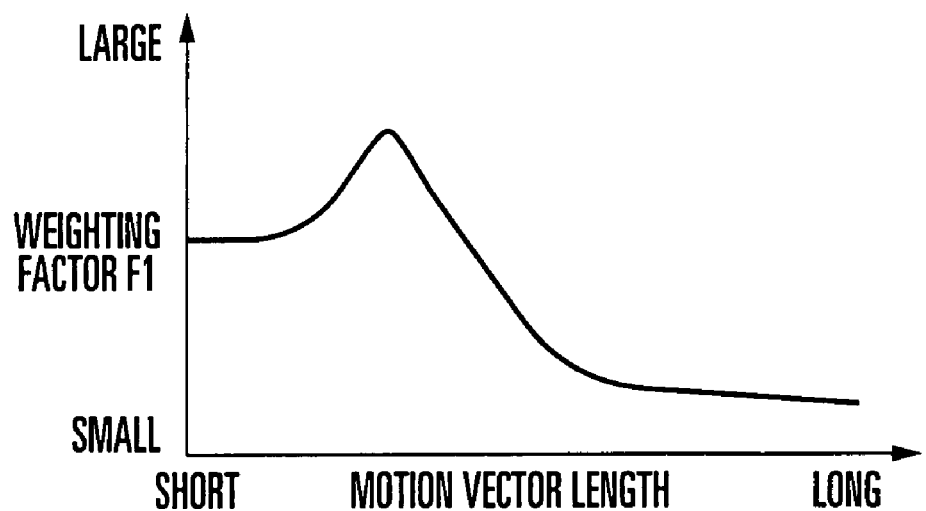
FIG. 20 is a graph showing a weighting factor with respect to the moving speed of local video deterioration according to the second embodiment of the present invention.

This method derives the weighting factor F1 for each target block of equation (4) (every time i is incremented) with respect to the length of the motion vector of each block from the relationship between the length of a motion vector of a deteriorated video which is obtained in advance and the weighting factor F1. As shown in FIG. 20, the weighting factor F1 decreases when the video has no motion (the motion vector is short) or the motion of the video is too fast to follow (the motion vector is long), and increases when the moving speed of the video is intermediate. Note that this method derives the relationship between the length of a motion vector of a deteriorated video and the weighting factor F1 from the subjective assessment characteristic (the average value of the spatial feature amounts DS) obtained by adding specific local deterioration to a region including different motion vector lengths.

Figure 21:
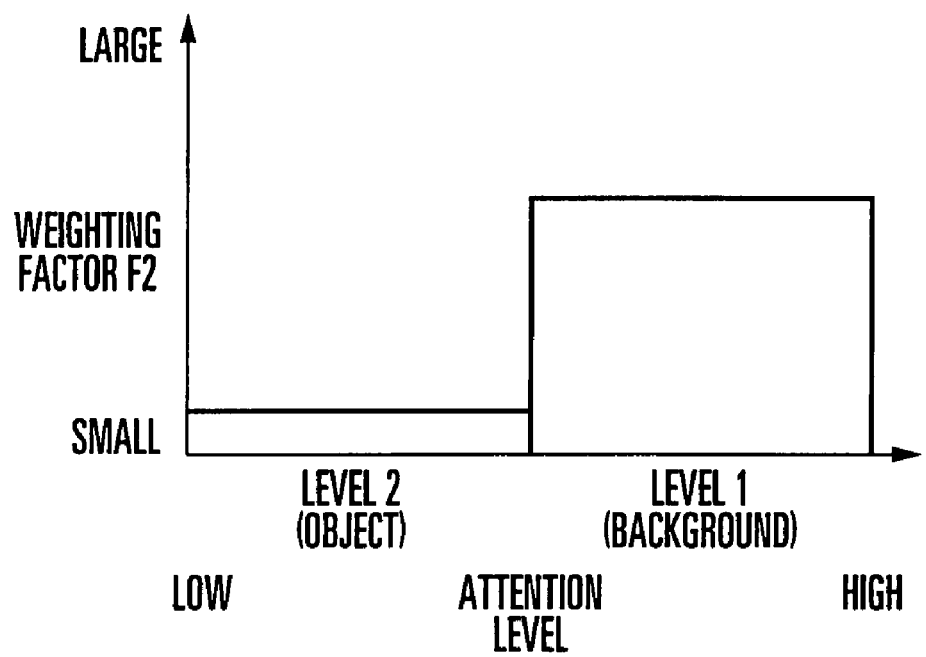
FIG. 21 is a graph showing a weighting factor with respect to the attention level of local video deterioration according to the second embodiment of the present invention.

This method determines the attention level in accordance with the threshold derived in step S31 from the length and direction of a motion vector for each block, and derives the weighting factor F2 for each target block of equation (4) (every time i is incremented) from the relationship between the attention level obtained in advance and the weighting factor F2. As shown in FIG. 21, the weighting factor F2 increases for a region exhibiting a high attention level, e.g., an object region, and decreases for a region exhibiting a low attention level, e.g., a background region. Note that as the relationship between an attention level and the weighting factor F2, this method derives an optimal relationship with consideration being given to the influence of the weighting factor F1 from the subjective assessment characteristic (the average value of the spatial feature amounts DS) obtained by adding specific local deterioration to a video for which an attention level is classified in advance (classified according to camera work matching the movement of the subject by using a motion vector in the above manner).

It suffices to obtain in advance the weighting factor F1 in the form of a table from the motion vector of each block in step 30 instead of step 33, also obtain in advance the weighting factor F2 in the form of a table for each block after deriving a threshold for discriminating an attention level from motion vectors in one frame in step 31, and calculate weighting factors by referring to the tables at the time of calculation of equation (4) in step 33.

In this manner, the derivation of the spatial feature amount DS is complete. The first derivation means 121 of the temporal/spatial feature amount derivation unit 12 performs the above processing for each frame in accordance with the lapse of time. The processing in step S2 except for the processing of deriving the spatial feature amount DS and the processing in steps S1 and S3 are the same as those in the first embodiment.

This embodiment can improve the accuracy of estimation of a subjective assessment value by performing weighting in consideration of a difference in subjective assessment due to the moving speed of a video and performing weighting in consideration of a difference in subjective assessment due to the attention level of the user with respect to the video.

In a video communication service to be provided in a fixed place (an environment in which a background is fixed), since it suffices to perform the processing in steps S31 and S32 for only an object portion, it is conceivable to obtain an inter-frame difference instead of a motion vector and perform simple calculation while regarding a region with an inter-frame difference as an object region and a region without any inter-frame difference as a background region.

Third Embodiment

The third embodiment of the present invention will be described next. This embodiment is designed to combine the method of deriving the spatial feature amount DS, which has been described in the first embodiment, and the method of deriving the spatial feature amount DS, which has been described in the second embodiment.

That is, a first derivation means 121 of a temporal/spatial feature amount derivation unit 12 calculates a deterioration amount for each block on the basis of steps S30 to S32 in the second embodiment with consideration being given to motion vectors. The first derivation means 121 then calculates the spatial feature amount DS according to equation (1) on the basis of steps S11 and S12 in the first embodiment with consideration being given to an average deterioration amount in an overall frame and an average deterioration amount in a region with a high deterioration intensity. This makes it possible to combine the derivation methods according to the first and second embodiments.

Note that each of the video quality objective assessment devices according to the first to third embodiments can be implemented by a computer including a CPU, a storage device, and an interface for the outside and programs which control these hardware resources. A video quality objective assessment program for causing such a computer to implement the video quality objective assessment method of the present invention is provided while being recorded on a recording medium such as a flexible disk, CD-ROM, DVD-ROM, or memory card. The CPU writes the program read from the recording medium in the storage device and executes the processing described in the first to third embodiments in accordance with the program.

INDUSTRIAL APPLICABILITY

The present invention can be applied to a video quality objective assessment technique of estimating subjective quality from the measurement of the physical feature amount of a video signal.

The invention claimed is:

1. A video quality objective assessment device comprising a temporal/spatial feature amount derivation unit which derives a temporal/spatial feature amount as a feature amount of deterioration which has occurred in a deteriorated video signal as an assessment target from the deteriorated video signal and a reference video signal as a signal before deterioration of the deteriorated video signal, and a subjective quality estimation unit which estimates a subjective quality concerning the deteriorated video signal by weighting the temporal/spatial feature amount on the basis of a relationship between a deteriorated video obtained in advance and a subjective assessment value obtained by a user,
wherein said temporal/spatial feature amount derivation unit includes
a) first derivation means for deriving a spatial feature amount in consideration of spatial locality of deterioration which has occurred in an assessment target frame of the deteriorated video signal,
b) second derivation means for deriving a temporal feature amount of deterioration which has occurred in an assessment target frame of the deteriorated video signal, and
c) third deviation means for deriving the temporal/spatial feature amount in consideration of spatial locality of deterioration which has occurred in the assessment target frame and locality on a time axis by using the spatial feature amount and the temporal feature amount.

2. A video quality objective assessment device according to claim 1, wherein said first derivation means of said temporal/spatial feature amount derivation unit obtains the spatial feature amount on the basis of a statistics of a spatial deterioration amount distribution in the assessment target frame a relationship between the statistics obtained in advance and a subjective assessment value obtained by the user.

3. A video quality objective assessment device according to claim 2, wherein one or an arbitrary combination of a frame average deterioration amount as a value obtained by averaging deterioration amounts by an overall assessment target frame, a size of a region of the assessment target frame in which deterioration included in a predetermined deterioration intensity range has occurred, a local deteriorated region average deterioration amount as a value obtained by averaging deterioration amounts belonging to the region, and a difference value between the frame average deterioration amount and the local deteriorated region average deterioration amount is used as a statistics of the deterioration amount distribution.

4. A video quality objective assessment device according to claim 1, wherein said third derivation means of said temporal/spatial feature amount derivation unit sets each of the spatial feature amount and the temporal feature amount as a deterioration amount, and derives the temporal/spatial feature amount with respect to each of the spatial feature amount and the temporal feature amount on the basis of a local deterioration amount on a time axis, an average deterioration amount without any local deterioration on the time axis, and a relationship between a deterioration amount obtained in advance and a subjective assessment value obtained by the user.

5. A video quality objective assessment device according to claim 4, wherein said third derivation means of said temporal/spatial feature amount derivation unit determines a local deterioration discrimination threshold on the basis of a relationship between a deterioration amount obtained in advance and a subjective assessment value obtained by the user, and determines that the local deterioration has occurred, when a difference value between a deterioration amount at a current time point and the average deterioration amount up to the current time point is not less than the local deterioration discrimination threshold.

6. A video quality objective assessment device according to claim 5, further comprising a deterioration intensity database which stores a variation amount of the local deterioration and a relationship between a duration and a deterioration intensity which are determined in consideration of influences of the variation amount of the local deterioration and the duration with respect to the average deterioration amount on a subjective assessment obtained by the user, wherein said third derivation means of said temporal/spatial feature amount derivation unit acquires a deterioration intensity corresponding to the variation amount of the local deterioration and the duration from said deterioration intensity database.

7. A video quality objective assessment device according to claim 6, further comprising a first table which stores a total value of deterioration intensities determined on the basis of a relationship between a deterioration amount and a subjective assessment value, and a second table which stores a relationship between a temporal/spatial feature amount and the total value of deterioration intensities determined on the basis of the relationship between the deterioration amount and the subjective assessment value obtained by the user, wherein said third derivation means of said temporal/spatial feature amount derivation unit totalizes deterioration intensities acquired from said deterioration intensity database for each unit measurement interval on the basis of said first table, and derives the temporal/spatial feature amount from the total value of deterioration intensities on the basis of said second table.

8. A video quality objective assessment device according to claim 1, wherein said first derivation means of said temporal/spatial feature amount derivation unit detects a motion of a video in the reference video signal for each block on the basis of an inter-frame difference value for each block obtained by dividing a frame, and obtains the spatial feature amount by weighting, for each block, a deterioration amount of each block of the deteriorated video signal on the basis of a motion of a video detected in a corresponding block of the reference video signal and a relationship between a moving speed of a deteriorated video obtained in advance and a subjective assessment value obtained by the user.

9. A video quality objective assessment device according to claim 1, wherein said first derivation means of said temporal/spatial feature amount derivation unit detects a motion of a video in the reference video signal for each block on the basis of a motion vector of each block obtained by dividing a frame, and obtains the spatial feature amount by weighting a deterioration amount of a block of the deteriorated video signal on the basis of a motion of a video detected in a corresponding block of the reference video signal and a relationship between a moving speed of a deteriorated video obtained in advance and a subjective assessment value obtained by the user.

10. A video quality objective assessment device according to claim 1, wherein said first derivation means of said temporal/spatial feature amount derivation unit derives an attention degree of the user with respect to the reference video signal for each block on the basis of a motion vector of each block obtained by dividing a frame, and obtains the spatial feature amount by weighting a deterioration amount of a block of the deteriorated video signal on the basis of an attention degree derived from a corresponding block of the reference video signal and a relationship between an attention degree of the user with respect to a deteriorated video obtained in advance and a subjective assessment value obtained by the user with respect to the deteriorated video.

11. A video quality objective assessment method comprising a temporal/spatial feature amount derivation step of deriving a temporal/spatial feature amount as a feature amount of deterioration which has occurred in a deteriorated video signal as an assessment target from the deteriorated video signal and a reference video signal as a signal before deterioration of the deteriorated video signal, and a subjective quality estimation step of estimating a subjective quality concerning the deteriorated video signal by weighting the temporal/spatial feature amount on the basis of a relationship between a deteriorated video obtained in advance and a subjective assessment value obtained by a user, wherein said temporal/spatial feature amount derivation step includes
a) deriving a spatial feature amount in consideration of spatial locality of deterioration which has occurred in an assessment target frame of the deteriorated video signal,
b) deriving a temporal feature amount of deterioration which has occurred in an assessment target frame of the deteriorated video signal, and
c) deriving the temporal/spatial feature amount in consideration of spatial locality of deterioration which has occurred in the assessment target frame and locality on a time axis by using the spatial feature amount and the temporal feature amount.

12. A non-transitory computer-readable recording medium having a computer-readable program embodied therein, the computer-readable program comprising instructions for controlling a computer to implement a temporal/spatial feature amount derivation step of deriving a temporal/spatial feature amount as a feature amount of deterioration and a reference video signal as a signal before deterioration of the deteriorated video signal, and a subjective quality estimation step of estimating a subjective quality concerning the deteriorated video signal by weighting the temporal/spatial feature amount on the basis of a relationship between a deteriorated video obtained in advance and a subjective assessment value obtained by a user, wherein said temporal/spatial feature amount derivation step includes
a) deriving a spatial feature amount in consideration of spatial locality of deterioration which has occurred in an assessment target frame of the deteriorated video signal,
b) deriving a temporal feature amount of deterioration which has occurred in an assessment target frame of the deteriorated video signal, and
c) deriving the temporal/spatial feature amount in consideration of spatial locality of deterioration which has occurred in the assessment target frame and locality on a time axis by using the spatial feature amount and the temporal feature amount.

* * * * *